US009231783B2

(12) United States Patent
Lynch et al.

(10) Patent No.: US 9,231,783 B2
(45) Date of Patent: Jan. 5, 2016

(54) METHODS, APPARATUS AND SYSTEMS FOR TRAFFIC IDENTIFICATION

(71) Applicant: InterDigital Patent Holdings, Inc., Wilmington, DE (US)

(72) Inventors: Kenneth F. Lynch, Wayne, PA (US); Alexander Reznik, Titusville, NJ (US); Scott C. Hergenhan, Collegeville, PA (US); Martin Jolicoeur, Dollard-des-Ormeaux (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 410 days.

(21) Appl. No.: 13/675,080

(22) Filed: Nov. 13, 2012

(65) Prior Publication Data

US 2013/0124738 A1    May 16, 2013

Related U.S. Application Data

(60) Provisional application No. 61/559,438, filed on Nov. 14, 2011.

(51) Int. Cl.
| | |
|---|---|
| *G06F 15/16* | (2006.01) |
| *H04L 12/64* | (2006.01) |
| *H04L 29/06* | (2006.01) |
| *H04W 4/00* | (2009.01) |
| *G06F 12/00* | (2006.01) |
| *H04W 4/02* | (2009.01) |

(52) U.S. Cl.
CPC ............ *H04L 12/6418* (2013.01); *H04L 29/06* (2013.01); *H04W 4/00* (2013.01); *H04W 4/005* (2013.01); *H04W 4/02* (2013.01)

(58) Field of Classification Search
USPC .................. 709/203, 217–219, 223–229, 250
See application file for complete search history.

(56) References Cited

U.S. PATENT DOCUMENTS

| 6,865,713 | B1 * | 3/2005 | Bates et al. ................... 715/233 |
| 7,483,380 | B2 * | 1/2009 | Metke ........................... 370/238 |
| 2006/0045132 | A1 * | 3/2006 | Metke ........................... 370/477 |
| 2012/0281529 | A1 * | 11/2012 | Singamsetty et al. ......... 370/230 |
| 2013/0297705 | A1 * | 11/2013 | Arora et al. ................... 709/205 |

OTHER PUBLICATIONS

"3rd Generation Partnership Project; Technical Specification Group Core Network and Terminals; Access Network Discovery and Selection Function (ANDSF); Management Object (MO); Release 10", 3GPP TS 24.312 V10.3.0, Jun. e2011, 155 Pages.
"3rd Generation Partnership Project; Technical Specification Group Core Network and Terminals; Access to the 3GPP Evolved Packet Core (EPC)", 3GPP TS 24.302 10.3.1, Apr. 2011, 57 pages.

(Continued)

*Primary Examiner* — Zarni Maung
(74) *Attorney, Agent, or Firm* — Theodore Naccarella

(57) ABSTRACT

Embodiments for enabling traffic content identification by a wireless transmit/receive unit are provided. The WTRU may store interface binding entries in a database associating links in a web page to various traffic content types, such as video, audio, and text. Upon a request to access one of the links, a socket may be created based on a data mobility policy associated with the traffic content type. Alternately, the database may associate the links directly to interface types based on the data mobility policies. The Access Network Discovery and Selection Function (ANDSF) may provide the data mobility policies to the WTRU.

11 Claims, 13 Drawing Sheets

(56) References Cited

OTHER PUBLICATIONS

"3rd Generation Partnership Project; Technical Specification Group Services and System Aspects; Data Identification in ANDSF (DIDA); Release 11", 3GPP TR 23.855 V0.2.0, Jul. 2011, 9 Pages.

Motorola Mobility Nokia, "Conclusions for Content Type/Size", SA WG2 Temporary Document; SA WG2 Temporary Document; SA WG2 Meeting #88; S2-11507; Nov. 14-18, 2011, San Francisco, USA, Nov. 2011, 4 Pages.

* cited by examiner

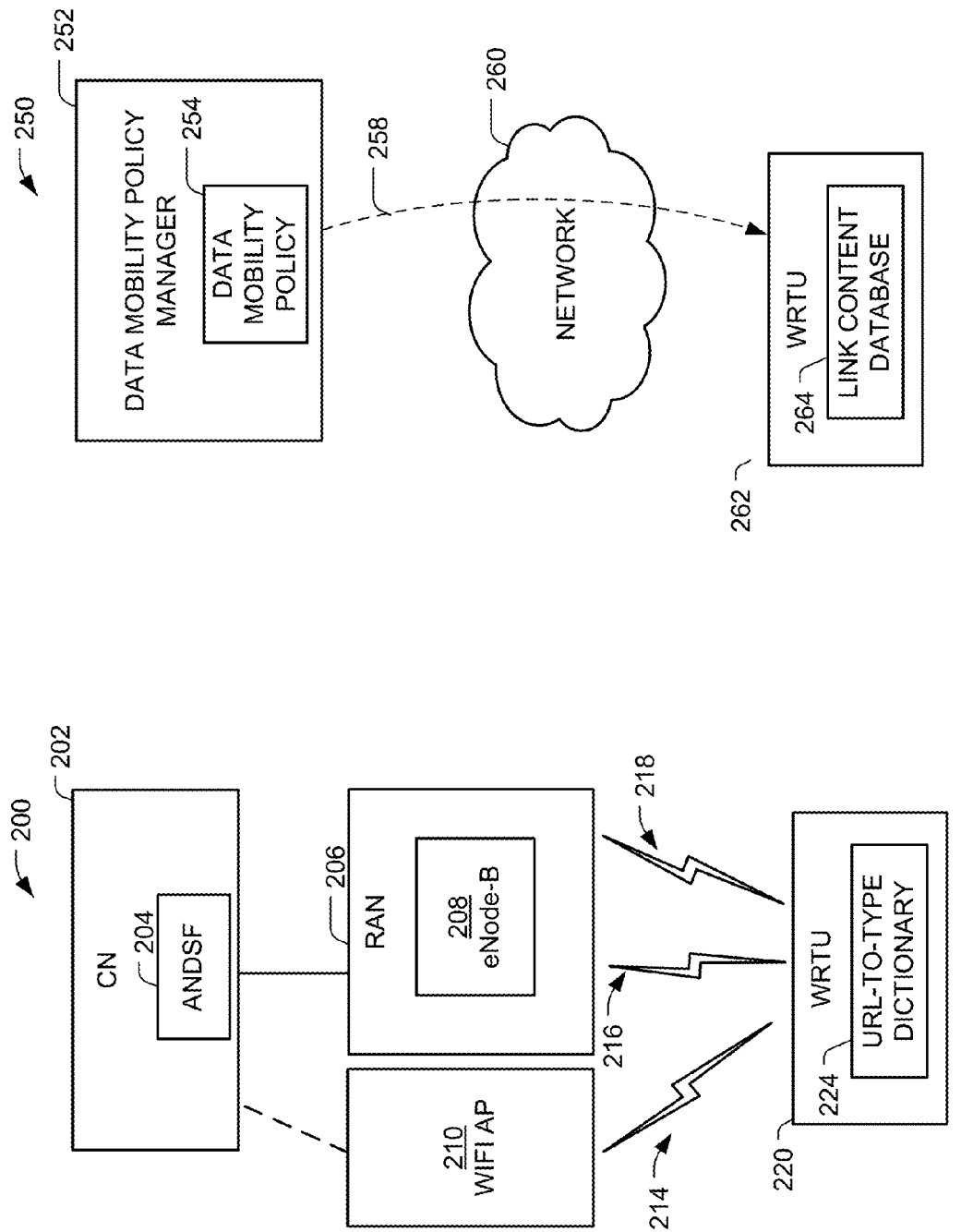

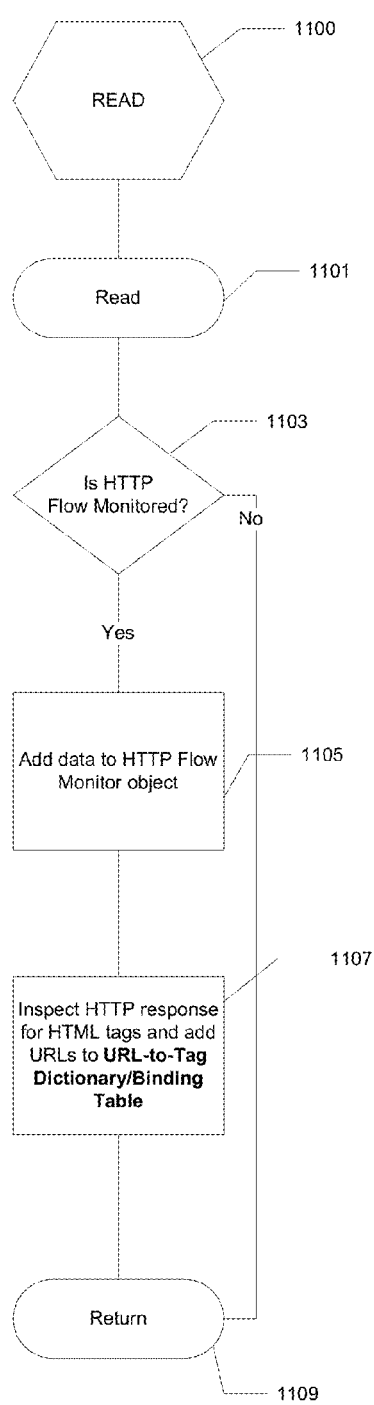
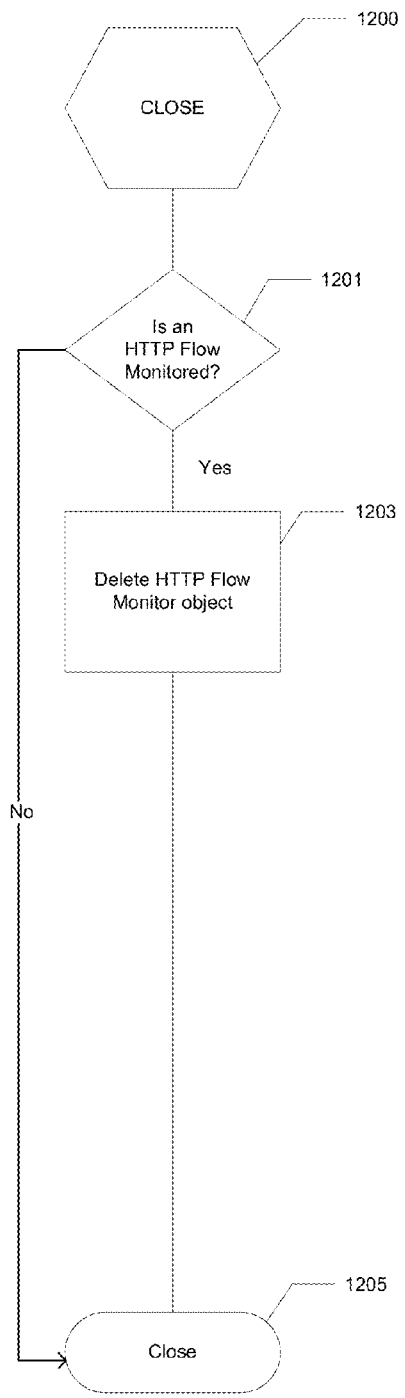
FIG. 11
FIG. 12

METHODS, APPARATUS AND SYSTEMS FOR TRAFFIC IDENTIFICATION

CROSS-REFERENCE TO RELATED APPLICATIONS

This application claims priority from U.S. Provisional Application No. 61/559,438, filed on Nov. 14, 2011, the contents of which are incorporated by reference herein.

BACKGROUND

Access Network Discovery and Selection Function (ANDSF) is an entity within an Evolved Packet Core (EPC) of 3GPP compliant mobile networks. Generally, ANDSF assists User Equipment (UE) in the discovery and selection of non-3GPP access networks, such as Wi-fi, or WIMAX, for example, that can be used for data communications in addition to 3GPP access networks (such as HSPA or LTE). ANDSF also provides the UE with rules policing the connection to these networks, such as Inter-System Routing Policies (ISRP), via a management object (MO). For example, various policies provided to the UE are designed to manage UE's inter-radio access technology (RAT) access selection and mobility, including on a per-flow basis. The ISRP provide the capability to identify traffic based on types of information, including extrinsic information available to the UE, such as the APN, and IP packet header information (e.g., transport protocol, destination port, and destination IP address).

SUMMARY

In one embodiment, a method, comprises: creating, by a wireless transmit/receive unit (WTRU), a first communication session having links; receiving incoming data in the first communication session, the incoming data containing a link; identifying a traffic content type associated with the link; creating an entry in a data structure associating the link with an interface type as a function of the traffic content type; subsequent to creating the entry in the data structure, receiving a request to create a second communication session; prior to creating the second communication session, determining if the request to create the second communication session matches the link of the entry in the data structure; and, when the request to create the second communication session matches the link of the entry in the data structure, selecting an interface for the second communication session of the interface type in the entry.

In one embodiment, a traffic identification method comprises: identifying an HTTP session; monitoring received HTML content in the HTTP session; identifying a link in the received HTML content; identifying a traffic content type of content associated with the link; storing an interface binding entry associating the link to an interface type; upon receiving a request for content at a requested link, comparing the requested link to the link in the interface binding entry; and, when the requested link matches the link in the interface binding entry, selecting an interface for receiving traffic from the requested link of the interface type in the entry.

In one embodiment, a method comprises: intercepting a connection request from an application; determining a host name associated with the connection request; comparing the host name to a list of known host names, in which list each of the known host names is associated with a corresponding interface type; and, when the host name matches one of the known host names, creating a socket for communications based on the corresponding interface type for the hostname in the list.

In one embodiment, a method comprises: receiving a connection request for a communication session from an application; reporting a successful connection status to an application prior to creating a socket for the communication session; receiving a request for data transmission in the communication session from the application, wherein the request for data transmission is associated with at least one of a tuple, a URL, and a host name; identifying a traffic content type based on the at least one of a tuple, a URL, and a host name; prior to sending the request call to a destination, opening a socket based on a traffic content type and a radio access technology access policy; and sending the request call via the socket.

In one embodiment, a method comprises: creating, by a wireless transmit/receive unit (WTRU), a first communication session having links; receiving incoming data in the first communication session, the incoming data containing a link identifying a location of other data; creating an entry in a data structure identifying the location of the other data; receiving a request to create a second communication session, the request including a location of data to be downloaded in the second communication session; prior to creating the second communication session, determining if the location in the request matches a location of an entry in the data structure; and, when the location in the request matches a location of an entry in the data structure, permitting establishment of the second communication session.

BRIEF DESCRIPTION OF THE DRAWINGS

A more detailed understanding may be had from the following description, given by way of example in conjunction with the accompanying drawings wherein:

FIGS. 2A and 2B are mobile communications architectures in accordance with various non-limiting embodiments;

FIG. 11 is a flow diagram showing operation in accordance with the first exemplary embodiment of the NBL responsive to a read command in association with an HTTP session;

FIG. 12 is a flow diagram showing operation in accordance with the first exemplary embodiment of the NBL upon closure of an HTTP session;

DETAILED DESCRIPTION

Figure 1A:
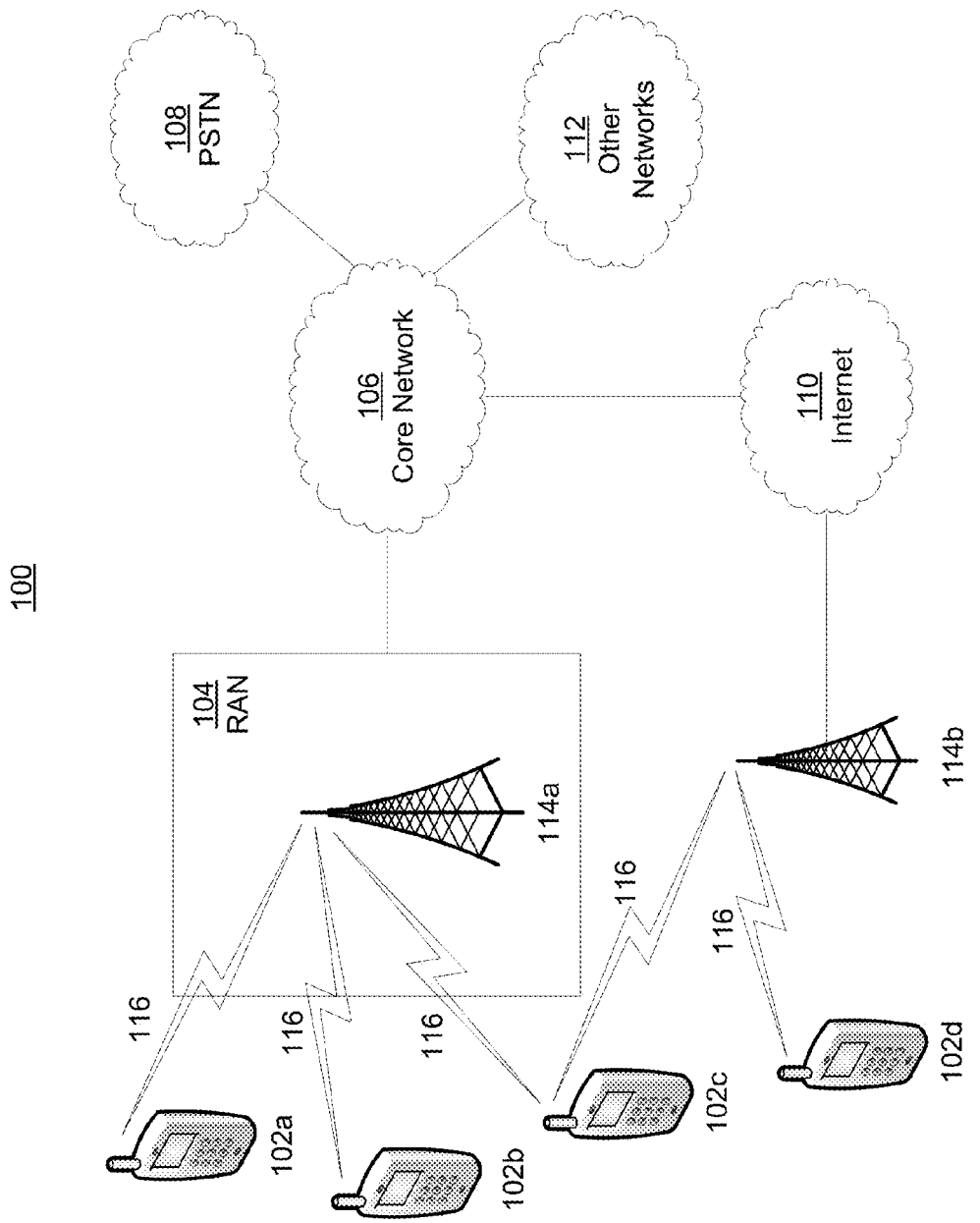
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
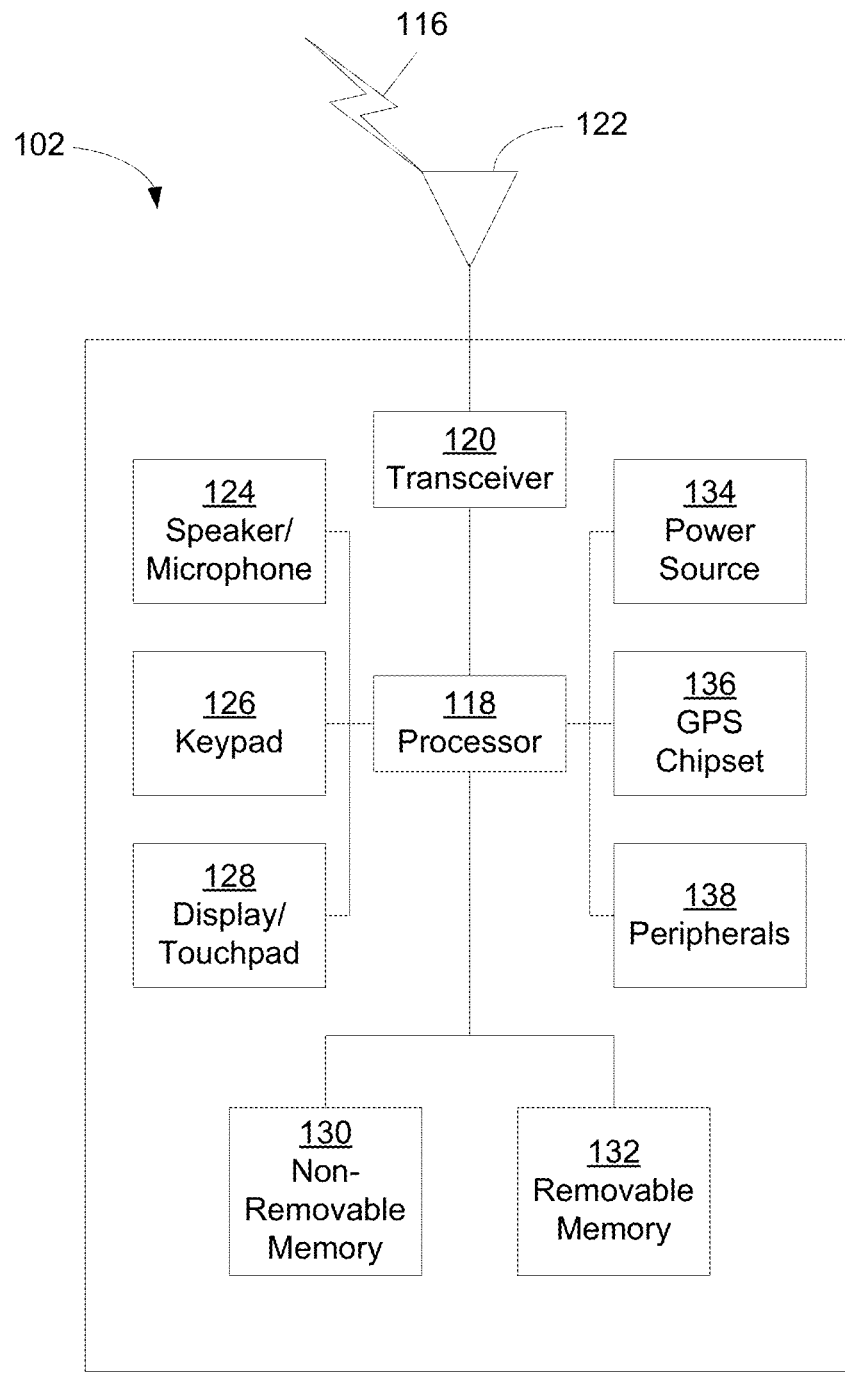
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality, and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
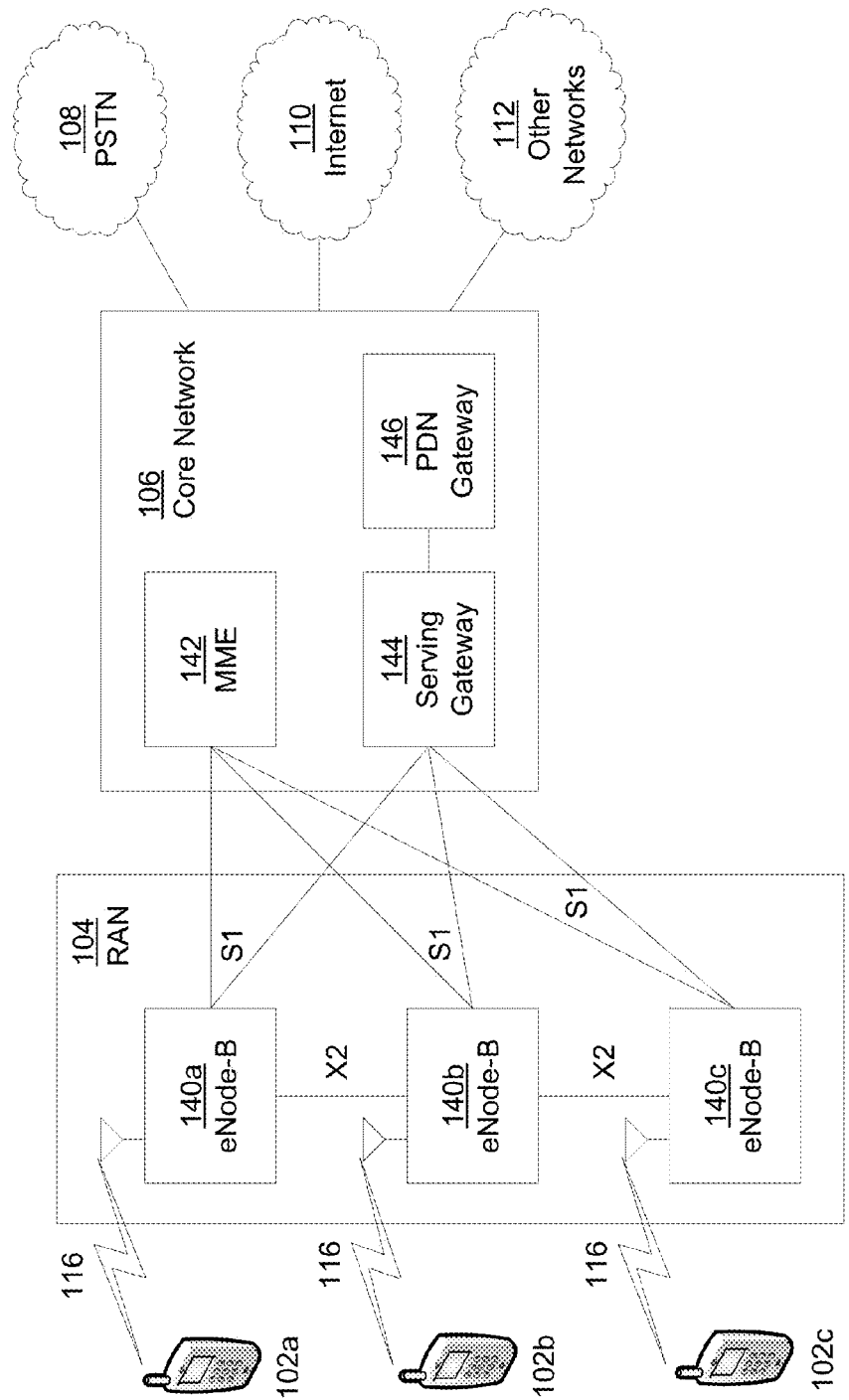
FIG. 1C is a system diagram of an example radio access network and an example core network that may be used within the communications system illustrated in FIG. 1A.
Figure 3:
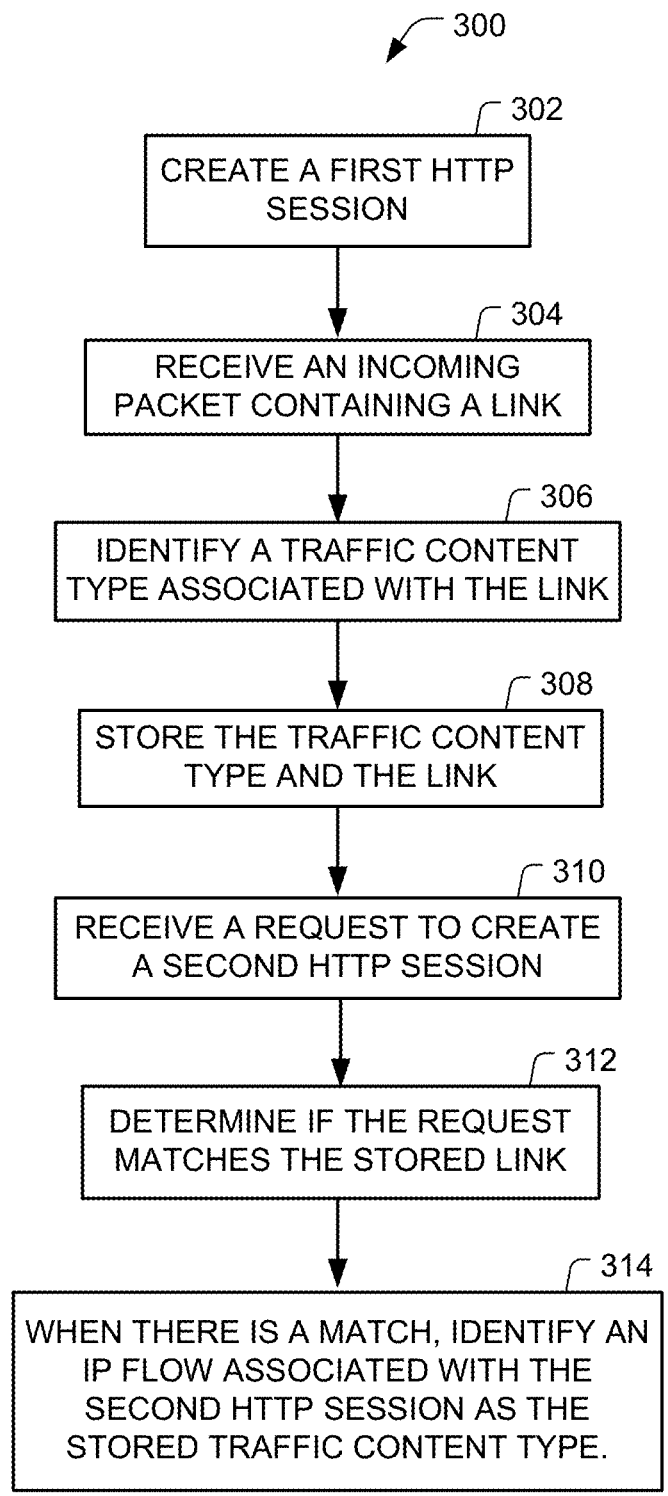
FIG. 3 is a flow chart of a traffic content identification method in accordance with one non-limiting embodiment.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

DIDA is a 3GPP SA2 Work Item that is targeted at improvement of data identification capabilities that UEs currently possess for the purposes of improved management of network resources. The initial draft of the 3GPP TR 23.855, "Data Identification in ANDSF (DIDA) (Release 11)," v. 0.1.0, April 2011 9 ("3GPP TR 23.855"), the entirety of which is incorporated herein by reference, provides an overview of the DIDA work item. The Inter-System Routing Policies (ISRP) enhancements introduced into the ANDSF policy management in Release 10 of 3GPP provide the capability to identify traffic based on the following two types of information (1) Access Point Name (APN), and (2) IP packet header information (such as the transport protocol, destination port and destination IP address). 3GPP TS 24.302, "Access to the 3GPP Evolved Packet Core (EPC) via non-3GPP access networks; Stage 3 (Release 10)," v. 10.3.1, April 2011 and 3GPP TS 24.312, "Access Network Discovery and Selection Function (ANDSF) Management Object (MO) (Release 10)," v. 10.2.1, April 2011, both of which are incorporated herein by reference in their entirety, provide details on ANDSF operation, the structure of the ANDSF MO, and how the policy is provided to a UE.

One option considered for advanced traffic identification is identification by "traffic type". In this case, the type of traffic carried by particular sessions (i.e. web page, video, image, audio, streaming, etc.) is identified and access selection and/or mobility decision is based on this information. Additional details regarding this process may be found in 3GPP TR 23.855. It has been speculated that identification by content type is too difficult and cumbersome to be practical. This speculation is based on the belief that a web-browsing process is a single continuous communication session.

For example, according to some, a web-browsing process may be summarized as the following single continuous communication session process. In a first step, an application in the WTRU issues a content request. The content is identified by a URI. In a second step, since the WTRU has ISRP policies based on content size/type, the WTRU suspends temporarily the retrieval of the requested content and attempts first to determine the size/type of the requested content. For this purpose, the WTRU needs to send a HEAD or GET request in order to receive the HTTP header of the requested content. In a third step, the UE determines the preferred radio access for the HEAD or GET request based e.g., on the destination IP address or destination port number. At this step, the WTRU cannot determine the preferred radio access based on content size/type. In a fourth step, the WTRU establishes a TCP connection over the preferred radio access (3GPP) for the HEAD or GET request. In a fifth step, the WTRU sends the HEAD or GET request and discovers the type/size of the requested content. In a sixth step, the WTRU determines the preferred radio access for retrieving the requested content based on the discovered content type/size and the provisioned ISRP policies. In a seventh step, the WTRU establishes a TCP connection over the radio access (WLAN) that is preferred to retrieve the content with the discovered type/size. In an eighth step, the content is retrieved and delivered to the requested application. Additional details regarding the premise of single continuous communication session may be found in 3GPP Tdoc S2-115007, Motorola Mobility, Nokia, "Conclusions for Content Type/Size," November 2011, which is incorporated herein by reference.

In contrast to the common belief that a web-browsing process is a single communication session (as described above), a web-browsing process consists of multiple sessions. To illustrate this point, a simple example may be considered. Suppose a user browses a web page (www.example.com) which contains a link to a video stream that can be viewed from the page. The web-browsing process may be summarized as the following process. The user (from a web-browser) requests the web page at www.example.com, which results in an HTTP request (i.e., an HTTP GET) to get the content of the web page. This request results in the establishment of an HTTP connection via the Transmission Control Protocol (TCP) (i.e. a TCP socket is opened) and communication is established. Once the web page transmission to the WTRU is completed, the communication session completes, in particular, the TCP socket is closed.

Supposing that the webpage contains a link to video content, for example "www.example.com/myvideo.mvi", when the user clicks on the link to the web page (which could be text, image, and so forth.), a new connection (i.e. a new TCP socket, etc.) is opened to get the video content. This process is contrary to the single continuous communication described above which makes a tacit assumption that the same connection is used to get the web page and the subsequent video. Thus, the systems and methods described herein generally relate to traffic identification based on the multiple sessions occurring during a web browsing process.

A typical web session involves at least a two-step process. First, a web page (HTML content) is requested by a WTRU. Second, using a link in the requested web page, additional content is requested. This additional or subsequent content, may be another web page (another HTML content) or different content, such as video, audio, image, text, and so forth. It is noted that DNS requests may be needed to resolve URLs and these would constitute separate sessions. Based on this process, the following systems and methods may be used to enable content identification by type. By default, (i.e. absent any "interface-binding entries" which are described in more detail below), the WTRU may monitor all new sessions. In some embodiments, all HTTP sessions are tagged as HTML by default. Identification of HTTP sessions can be performed using one or more of any suitable techniques, such as, without limitation, by using the destination port, by application name/type, simple inspection of the first few outgoing packets of the session, which will identify the application protocol as HTTP, and/or inspection of DNS requests which often precede the HTTP session. With regard to using the source port for identification purposes, it is noted that TCP port 80 is almost always used for HTTP sessions. For techniques using application name/type for identification purposes, absent other information (e.g. the "interface-binding entry" which is described in more detail below), sessions started by web browsing applications may be assumed to be HTTP sessions.

Once an HTML session has been identified, the return traffic, containing the actual HTML content is monitored for links. Although this monitoring involves inspection of incoming packets, given that the data is plain text and the links are always clearly tagged, the complexity is, in fact, relatively low. Links that are identified during the inspection process may then be examined further to identify a content type that is being linked. The content type (such as video, image, audio, and so forth) is typically apparent from the link. Once this identification is complete, each link, together with its identified content type may become an entry stored by the system in a table or any other suitable storage structure, referred to herein as the binding table. The entries in the binding table preferably also store the interface type. In fact, the entries need not even include the content type, since, ultimately, it is the interface type to use for the connection that is the desired information, and not the content type per se, even though the interface is selected as a function of the content type. In some embodiments, the entries (hereinafter interface-binding entries) are stored temporarily in the binding table such that old (i.e., stale) entries are periodically pruned.

All new sessions are checked against the interface-binding entries in the binding table. If a content request in a session is for a URL that matches the URL of an interface-binding entry in the binding table, the session is identified with the interface type in the interface-binding entry, thus allowing traffic type identification before the start of the session. Based on the traffic type identification, various decisions may be made related to access selection and/or mobility, for example, including interface selection. As noted above, the binding table may be purged of interface-binding entries from sessions when those sessions are closed in order to save memory resources. In such embodiments, the binding table contains interface-binding entries only for existing communication sessions.

It is much more efficient to set up the connection initially using the desired RAT as opposed to having to change it during a communication session. Therefore, the creation of a socket may be deferred, or otherwise delayed, until the traffic content type of the incoming IP flow is identified. Thus, upon receiving a request from an application to create a socket, a successful connection may be reported back to the application even though an actual socket has yet to be created. By reporting back a successful connection, the application may then issue a request (such as a GET/POST request) which may contain path and host information. Using this path and host information, a traffic content type may be identified and then an actual socket may be created based on the policies provided to the WTRU by the ANDSF.

In accordance with one embodiment, the matching process may be similar to the following. First, a "connect" API call for HTTP (such as TCP/port 80, for example) may be intercepted from the application (e.g., a browser) and a conventional successful status returned to the application while actually deferring the creation of the socket. Next, the send call from the application may be intercepted and enough data to form a GET/POST request may be collected (which may be just one call) while the sending of data is deferred. A path and host name may be obtained from the GET/POST request to form an absolute URL, such as www.example.com/main/part1." Since HTTP 1.0 headers do not include a host name, in embodiments supporting HTTP 1.0, the host name may be retrieved, if necessary, from the local DNS resolver based on the IP destination address.

Next, the URL may be checked against the binding table. If present, then the traffic type is identifiable and the network interface to be used may be chosen as dictated by the entry in the binding table (i.e., based on the ISRP). Otherwise, a default network interface may be used. Next, a socket may be created and the GET/POST request may be sent on through the socket. The WTRU then waits for a response on the same connection. If the response content type is not "text/HTML", then the process may be stopped. Otherwise, the HTML content may be searched for tags having links to content types of interest. For example, tags and content types of interest may include, but are not limited to, <video>=video, <img>=image, <audio>=audio, <a>=HTML, and so forth. The URL may be parsed for each tag and the associated URLs of those tags and corresponding interface type (or content type mappable to an interface type) may be added to the binding table. It is noted that the host name may need to be added to form a full URL. Furthermore, in some embodiments, additional useful information may be stored, such as height/width for videos. Such information may be considered in making the decision as to which type of interface will be established. For example, smaller videos may be routed over cellular, but larger videos may be routed over Wi-fi.

Once the URL has been parsed and relevant information added to the binding table, the response may then continue on to the application.

By way of example, a video tag in a web page may contain the following text:

---
<video width="320" height="240" controls="controls">
    <source src="movie.mp4" type="video/mp4" />
    <source src="movie.ogg" type="video/ogg" />
    Your browser does not support the video tag.
</video>
---

Parsing this video tag would result in two entries being stored in the binding table, namely:

---
1) [example.com/movie.mp4 : Wi-fi]
2) [example.com/movie.ogg : Wi-fi]
---

Thus, subsequent to storing these entries in the binding table upon a request to obtain either "movie.mp4" or "movie.ogg" (e.g., by a user clicking on a link in the web page), the requested content may be readily identified as video content. Based on this traffic type identification, any relevant policies such as socket type may be applied to the IP flow containing the requested video.

In accordance with various embodiments, the systems and methods described herein assist in the selection of the interface on which the socket is created. While persistent HTTP connections may have multiple GETs in one connection, such a technique is typically used to load smaller content, such as pictures embedded in a page for instance. Large files, such as video content, for example, usually are loaded separately. Therefore, the systems and methods described herein may be applied to those larger files and, as such, relevant network policies may be enforced.

FIG. 2A illustrates a mobile communications architecture 200 in accordance with one non-limiting embodiment. As illustrated, a WTRU 220 is in communication with a core network 202 via a radio access network (RAN) 206 comprising an eBode-B 208. In some embodiments, RAN 206 may be a 3GPP RAN similar to RAN 104 in FIG. 1C. The mobile communications architecture 200 may also comprise a Wi-fi Access Point 210 or other non-3GPP wireless access technologies. For example, in some embodiments, the mobile communications architecture 200 may comprise WiMax access technologies, Bluetooth access technologies, and/or television whitespace access technologies, which may be collectively referred to as a non-3GPP RAN. In some embodiments, the Wi-fi Access Point 210 and/or other non-3GPP wireless access technologies may be combined or integrated with the eNode-B 208 to form a converged gateway architecture. In any event, the WTRU 220 may be in communication with, or at least capable of communicating with, the RAN 206 and the Wi-fi Access Point 210 via multiple radio access technologies (RATs). As illustrated, the WTRU 220 may communicate with the Wi-fi Access Point 210 via a first RAT 214 and the RAN 206 via a second RATs 216 and a third RAT 218. The ANDSF 204 of the core network 202 may define the policies and procedures defining which RATs are available to the WTRU and which types of traffic may be sent via which RATs (i.e., data mobility policies).

The WTRU 220 may communicate with the ANDSF 204 (e.g., over an S14 reference point) during an initialization process and/or throughout a session. While not illustrated in FIG. 2 for purposes of clarity, it is to be appreciated that the communications between the WTRU 220 and the ANDSF 204 may pass through the RAN 206. The WTRU 220 may locally store a binding table 224. The binding table 224 may be updated based on the parsing of the URLs requested by the WTRU 220. The data stored in the binding table may be periodically, or at least occasionally, pruned to remove data likely relevant to stale links.

While, for the sake of convenience, the systems and methods described herein are described largely in the context of the ANDSF, this disclosure is not so limited. In fact, the systems and methods described herein may be used in a variety of implementations beyond the ANDSF. FIG. 2B illustrates an example mobile communications architecture 250 in accordance with another non-limiting embodiment. As illustrated, a WTRU 262 is in communication with a Data Mobility Policy Manager 252 via a network 260. The Data Mobility Policy Manager 252 may be similar to ANDSF, or any other suitable policy manager or entity. The Data Mobility Policy Manager 252 maintains a Data Mobility Policy 254. The Data Mobility Policy 254 may generally define the policies and/or procedures that WTRUs associated with the Data Mobility Policy Manager 252 may utilize for IP flow management. The Data Mobility Policy 254 may be similar to a management object (MO), or any other suitable policy or collection of policies. The Data Mobility Policy Manager 252 may send a Data Mobility Policy Manager communication 258 that includes policy information to the WTRU 262. The WTRU 262 may locally store a link content database 264. The data stored in the link content database 264 may be generated by the parsing of URLs requested by the WTRU 262.

FIGS. 3-6 are process flows for various methods in accordance with non-limiting embodiments. Referring first to process flow 300 of FIG. 3, at 302, a first HTTP session is created by the WTRU (or other UE). At 304, an incoming packet is received. The exemplary incoming packet contains a link to other content. At 306, a traffic content type associated with the link is identified. The traffic content type may be identified, for example, by parsing the URL associated with a tag in the link. At 308, the traffic content type, corresponding interface type, or both are stored in a data structure, such as the aforementioned binding table, in association with the link. For example, an interface-binding entry may be stored in a binding table, link content database, table, or other suitable storage vehicle. At 310, another request to create a HTTP session is received. At 312, prior to creating another HTTP session, it is determined if this second request matches any link stored in the storage vehicle. If the content of the second HTTP request matches a stored link, processing proceeds to 314, where an IP flow associated with the second HTTP request may be identified as corresponding to the traffic content type and/or interface type associated with that link in the corresponding interface-binding entry. In some embodiments, once the traffic content type has been identified, a socket may be created using the radio access technology (RAT) identified in a data mobility policy of an Access Network Discovery Selection Function (ANDSF) Management Object (MO). In some embodiments, if the request does not match any link stored in the storage vehicle as determined in step 312, a socket may be created using a default RAT.

Figure 4:
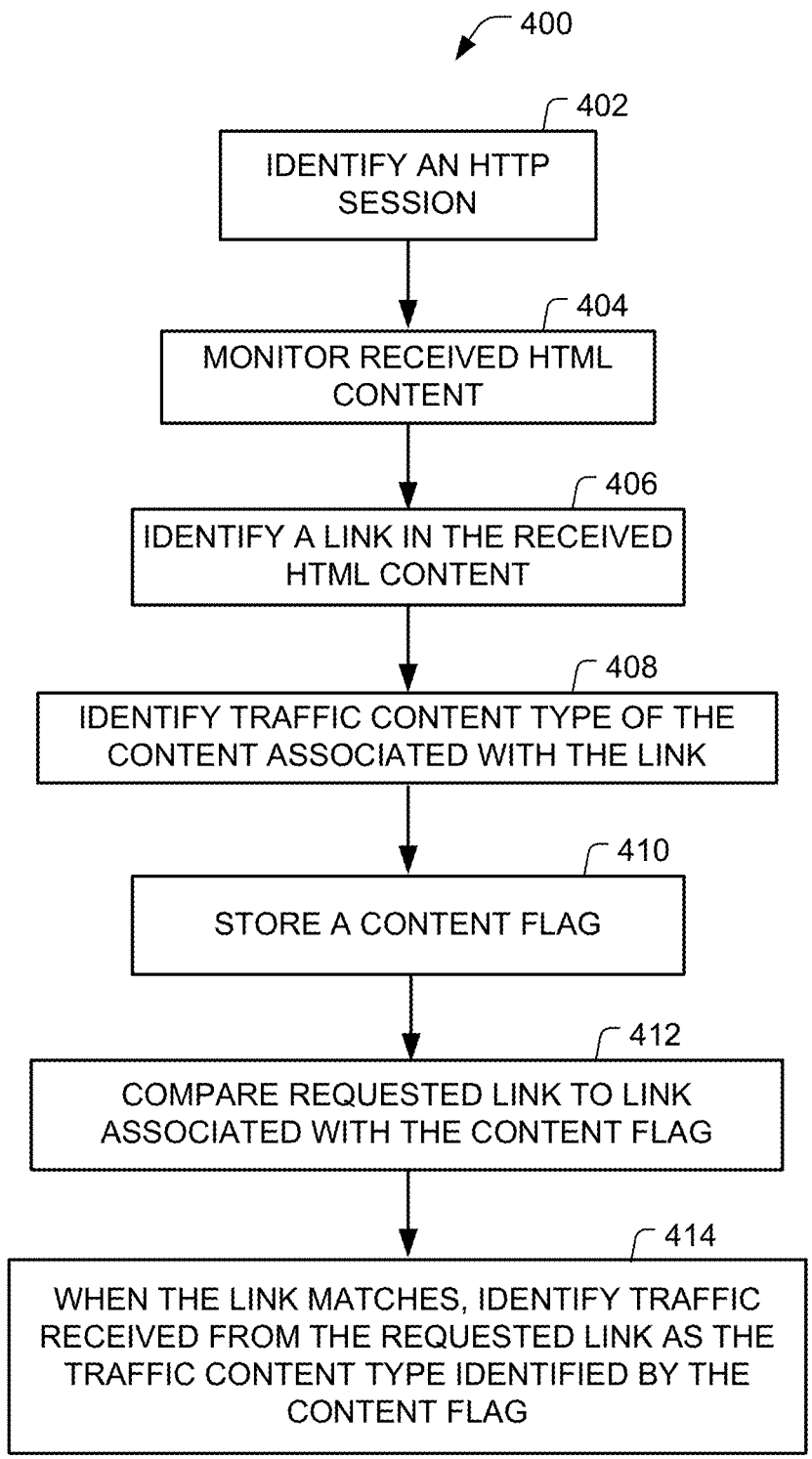
FIG. 4 is a flow chart of a traffic content identification method in accordance with another non-limiting embodiment.

Referring now to an alternative process flow 400 in FIG. 4, at 402, an HTTP session is identified. In some embodiments, the HTTP session may be identified by the destination port and/or the application name/type, for example. Alternately, inspection of the first few outgoing packets of the session may be used to identify the application protocol as HTTP. In any event, at 404, received HTML content may be monitored. At 406, a link in the received HTML content may be identified. At 408, a traffic content type of the content associated with the link is identified. At 410, an interface-binding entry is stored. As previously noted, the interface-binding entry may associate the link with a traffic content type (which is associated with a desired interface type via a data mobility policy) or directly with the desired interface type. At 412, upon receiving a request for content at a requested link, the requested link may be compared to the link associated with the interface-binding entry. At 414, when the requested link matches the link associated with the interface-binding entry, traffic received from the requested link is identified as the traffic content type identified by the interface-binding entry and/or is routed through an interface of the type specified in the interface-binding entry.

Figure 5:
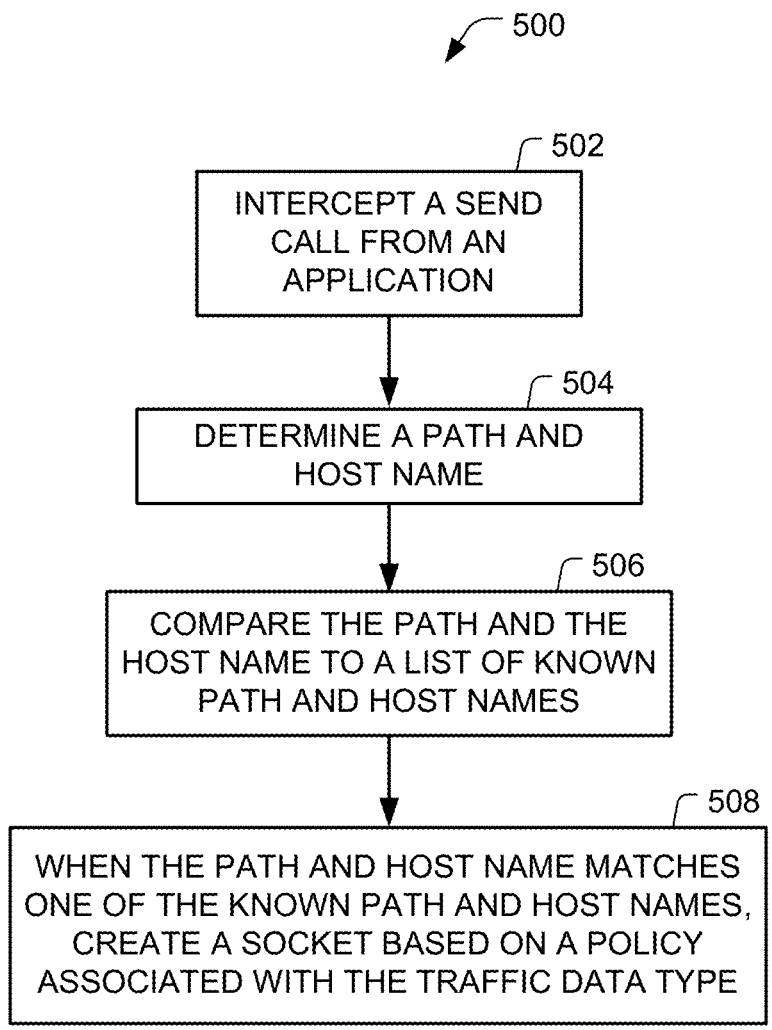
FIG. 5 is a flow chart of a traffic content identification method in accordance with a further non-limiting embodiment.

Referring now to yet another alternate process flow 500 in FIG. 5, in which content type may be identified through use of path and host name data at 502, a send call from an application is intercepted. At 504, a path and host name associated with the send call is determined. At 506, the path and the host name are compared to a list of known path and host names. Each of the known path and host names may be associated with a corresponding traffic data type. If the path and host name matches one of the known path and host names, flow proceeds to 508 and a socket is created and bound to an interface type based on a policy associated with the traffic data type of the matched known path and host name. Otherwise, a default network interface type is used for communication with the host.

Figure 6:
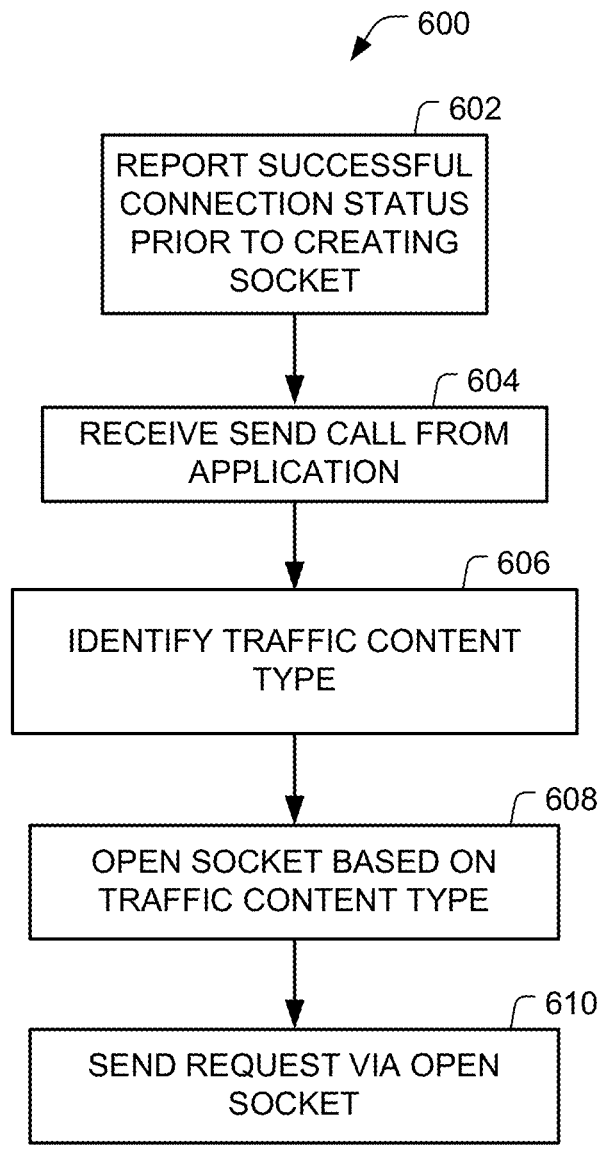
FIG. 6 is a flow chart of a traffic content identification method in accordance with yet another non-limiting embodiment.

Referring now to one further alternate process flow 600 in FIG. 6, at 602, a successful connection status is reported to an application prior to creating a socket. At 604, a send call from the application is received. The send call may identify a path and host name. At 606, a traffic content type is identified based on the path and host name. At 608, prior to sending a request call, a socket is opened based on a traffic content type and a radio access technology access policy. At 610, the request call is sent via the socket.

FIGS. 9-15 are flow charts that illustrate further, more specific embodiments in accordance with the principles of the present invention.

Figure 7:
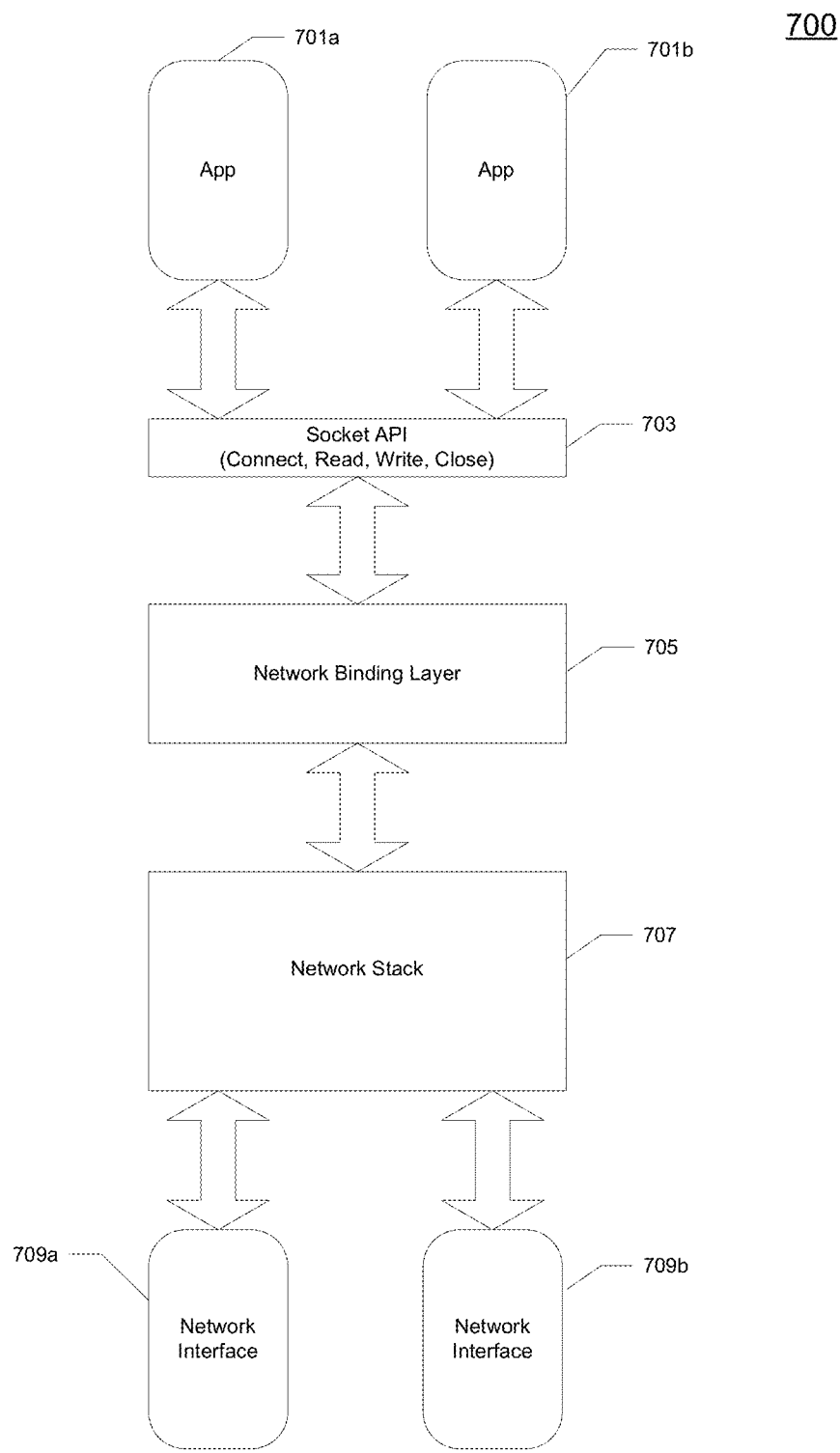
FIG. 7 is a block diagram of an exemplary protocol stack in accordance with an embodiment of the invention.

In accordance with one embodiment, the relevant functionality is implemented in a new layer herein termed the Network Binding Layer (NBL), which is interposed between the application layer and the protocol stack as illustrated in FIG. 7. As shown, the client 700 has multiple network interfaces 709*a*, 709*b* (e.g., Wi-fi and 3GPP), a traditional Network Protocol Stack 707 (commonly TCP/IP) running over the network interfaces, and applications 701*a*, 701*b* running over the Protocol Stack 707. However, whereas the applications 701*a*, 701*b* conventionally use the Socket API 703 to communicate directly with the Protocol Stack 707, a new entity, the Network Binding Layer (NBL) 705, is added to the client between the Network Stack 707 and the Socket API 703. In one embodiment, the operation of the NBL 705 is completely transparent to the applications 701*a*, 701*b*. As will be described in greater detail herein below, the NBL 705 intercepts communications from the applications to the Network Stack, performs processing to select interface functions, and then calls the original Network Stack functions. The NBL 705 checks forward links within the flow to determine the content type to which those links lead and stores the link-to-content type data for later use if and when any of those links are selected by the user so as to be able to set up the connection initially using a desired socket and interface type (e.g., Wi-fi for video content, 3GPP for images). Then, when one of those links is selected by the user to open a new TCP or UDP flow, the NBL 705 binds the corresponding new TCP or UDP flow to a socket of a chosen network interface type (e.g., 3GPP or Wi-fi) based on the corresponding content type stored for that link. The content type of the flows may be identified by the NBL using one or more of several pieces of available information, including: (a) a 3-tuple (destination IP address, layer 4 protocol (TCP/UDP), layer 4 destination port), (b) a full 5-tuple, which includes the fields of the aforementioned 3-tupple plus source port and source IP, (c) the HTTP URL (including wild cards. Ex: "www.interdigital.com/video/*" or "*.mpg"), and (d) HTML tag type (ex: video, image, . . . ).

The NBL 705 may be implemented in several manners, including, but not limited to, by modifying the Network Stack, by intercepting or "hooking" the socket API in the system (for all applications), or as a separate application between the Socket API and the Network Stack (which is the implementation illustrated in FIG. 7).

The NBL 705 maintains at least two tables or other data structures. The first, herein termed the TagtoInterfaceMapping table, may be a static table. It may be preconfigured on the device and/or modified via operator/user/etc. policy. This table pairs content types to interface types. For instance, the TagtoInterfaceMapping table may dictate that video type content be routed over Wi-fi and that still images be routed over cellular. The TagtoInterfaceMapping table does not necessarily contain direct mappings from content types to interface types, but, for instance, may include mappings of tuples to interface types, etc. The second table/data structure is the binding table. The binding table pairs any one or more of (a) specific URLs, (b) tuples, and (c) host names communication sessions with content types. Each content type may map directly to an interface type (i.e., RAT). Alternately, of course, the binding table may pair the URLs, tuples, and host names directly to interface types as a function of the mappings in the TagtoInterfaceMapping table.

Figure 8:
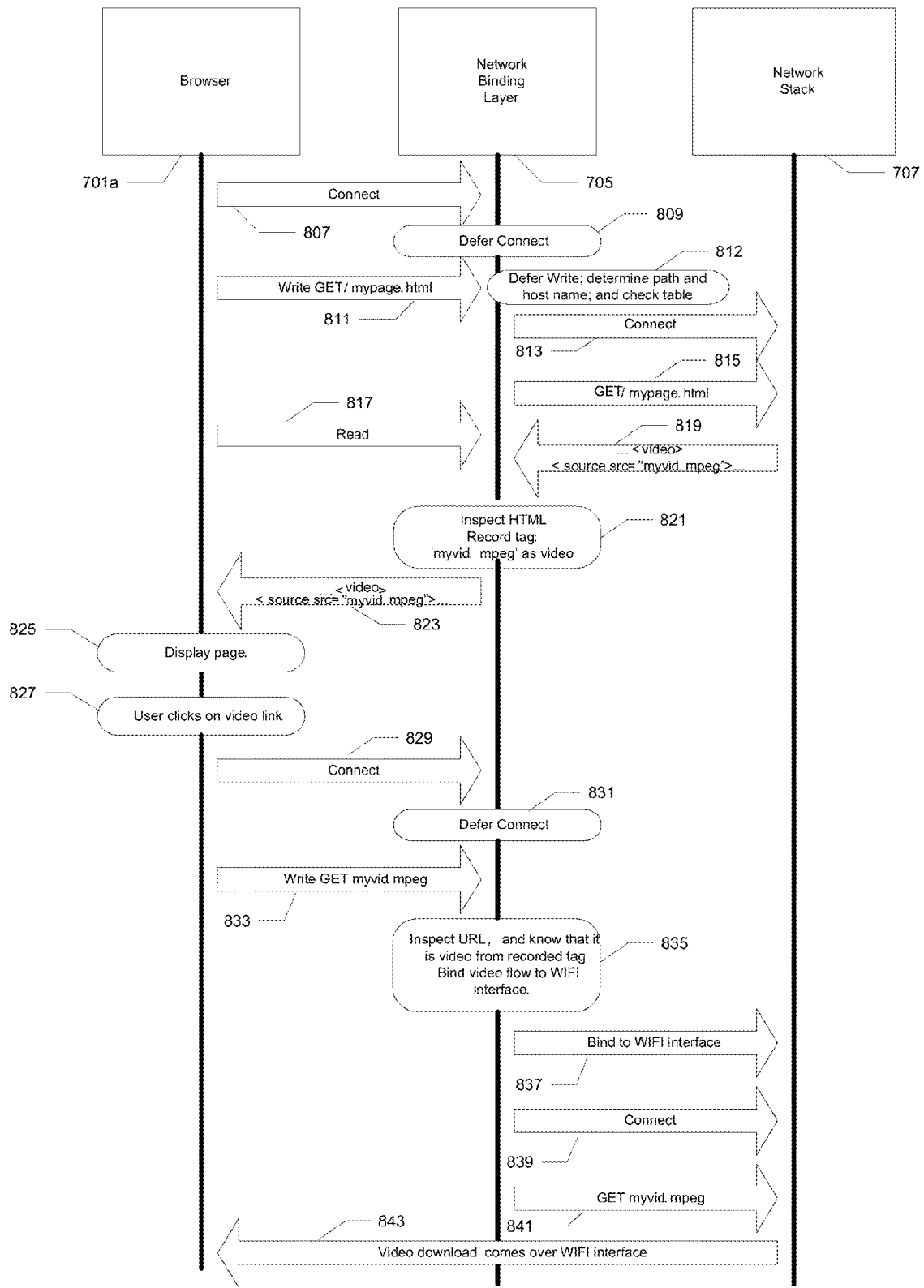
FIG. 8 is a signal flow diagram showing signal flow between the application, Network Binding Layer (NBL) and network stack in accordance with an embodiment of the invention.

FIG. 8 is a signal flow diagram illustrating exemplary signaling between an application, e.g., a web browser 701*a*, the NBL 705, and the Network Stack 707 in accordance with an exemplary embodiment of the invention.

As shown at 807, the browser 701*a* issues a "connect" API call for HTTP (tcp/port 80). The network binding layer 705 intercepts the "connect" call. The NBL 705 does not create an actual socket yet nor does it forward the "connect" call to the Network Stack to do so, but instead defers the creation of an actual socket as seen at 809. If necessary in accordance with the relevant protocol, the NBL 705 may return a conventional successful status message (not shown) to the browser 701*a*. Typically, next, as shown at 811, the browser 701*a* issues a write/send/send-to call seeking the desired HTML page. At 812, the NBL 705 intercepts this message and collects and stores sufficient data from within the GET message to be able to later transmit an appropriate GET/POST request to the Network Stack 707, but defers the actual transmission of such a GET message to the Network Stack 707 at this time. The NBL further determines the path and host name from request 811 and forms an absolute URL (ex: www.example.com/main/part1). Since HTTP 1.0 headers do not have host names, if HTTP 1.0 needs to be supported, the NBL 705 may retrieve the host name from the local DNS resolver based on the IP destination address in the request. Also at 812, the NBL checks the binding table for a match based on one or more of URL, Host Name, or tuple (e.g., a 3-tuple or a 5-tuple). At 813, the NBL then issues a connect request to the Network Stack 707. Specifically, if a corresponding URL, host name, or tuple is found in the table, the NBL chooses the network interface type paired with that URL, host name, or tuple from the table. Otherwise, it selects a default network interface and connects the socket (i.e. calls the protocol stack's 'connect' API). Then, at 815, the NBL 705 sends the GET/POST request (corresponding to the write 811 from the browser 701a).

The NBL then intercepts the read/recv/recvfrom API call 817 from the browser while also waiting for a response 819 to the GET/POST 815 from the Network Stack 707 on the connection. The read 817 and the response 819 to the GET/POST 815 are asynchronous events and either event may occur first. In any event, if the response 819 has a content type that is not "text/HTML" (or another communication protocol type having forward links), then the processing for this socket can be halted. However, assuming that it is text/HTML, then at 821, the NBL examines the HTML content for tags having forward links to content types of interest, such as:

a. <video> = video
b. <img> = image
c. <audio> = audio
d. <a> = HTML

The NBL 705 will parse the URL for each tag (it may need to add a host name to form a full URL if the tag has a relative link definition in it instead of an absolute link definition) and add the tag to the binding table based on the TagtoInterfaceMapping table. It also could store any addition information that may be useful. For instance, the height/width for videos may be useful information since it may be desirable to use a different interface type as a function of the size of the video.

Below is an exemplary HTML5 video tag:

<video width="320" height="240" controls="controls">
<source src="movie.mp4" type="video/mp4" />
<source src="movie.ogg" type="video/ogg" />
Your browser does not support the video tag.
</video>

This tag would result in storing two entries (i.e., interface-binding entries) in the binding table. Particularly, assuming video is configured to go over a Wi-fi type interface, the following two entries would be added to the binding table:

[example.com/movie.mp4 : Wi-fi]
[example.com/movie.ogg : Wi-fi]

Next, at 823, the NBL forwards the response 819 on to the browser.

Next, at 825, the browser 701a will display the requested (and now received) page. If the user then clicks on the hyperlink corresponding to the above-noted video tag, as shown at 827, the browser 701a will issue a new connect API call 829. As shown at 831, the network binding layer 705 will intercept the connect and defer the connection. Also as described above in connection with the connect API call 807, if necessary according to the applicable protocol, the network binding layer may transmit back to the browser 701a a successful status message. After sending the connect request at 829 (and receiving a successful status indicator, if necessary), the browser will next issue an HTTP GET, which results in a socket Write call 833 seeking the desired video content, which the NBL 705 intercepts.

At 835, the NBL 705 inspects the URL in the call 833 and determines if there is an interface-binding entry in the binding table with that URL. Since, in this exemplary case, it will find such an entry, the NBL 705 decides that this flow should be bound to an interface of the interface type identified in the entry (or, if the entry identifies only a content type, the interface type corresponding to that content type as defined elsewhere in the system, such as by the ANDSF). At 837, the NBL binds the socket to the interface of the corresponding interface type, in this case Wi-fi. Note that, since the call 833 is not for HTML, but rather for video content, steps like steps 821 and 823 are not performed. Now, as shown at 839, the NBL can issue a "connect" to the network stack 707 corresponding to the connect 829 it received above from the browser. Further, as shown at 841, the NBL will now also transmit a GET message to the network stack corresponding to the write/send/send to call received from the browser 701a at 833.

Finally, at 843, the video content is received and passed through the network stack 707, through the NBL 705 without any significant processing, and on to the browser 701a.

FIGS. 9-12 demonstrate the details of the NBL operation for the relevant socket interface call that it intercepts. Note that the NBL allows socket calls of types other than those discussed herein and shown in FIGS. 8-12 to proceed through to the network stack unmodified.

Figure 9:
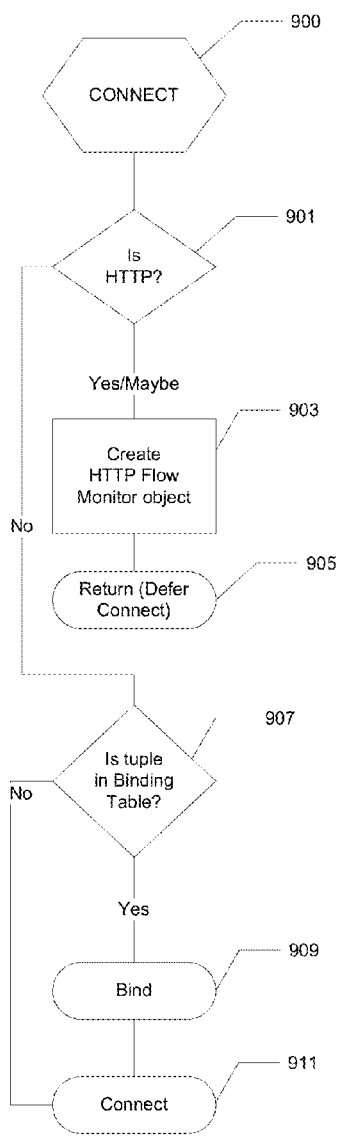
FIG. 9 is a flow diagram showing operation in accordance with a first exemplary embodiment of the NBL when an application commences an HTTP session.

Referring first to FIG. 9, when the NBL intercepts a connect call from the browser, such as those shown at 807 and 829 in FIG. 8, the NBL first checks if the call is for HTTP content (901). This may be done, for instance, by checking for a destination port of 80.

If the protocol is not HTTP, then no future HTTP-based processing is performed, and flow proceeds to step 907, in which the NBL checks to determine if the call includes a tuple that is in the binding table. If not, the NBL causes the network stack to open a connection in a conventional manner, as shown at 911.

If, however, the tuple is in the binding table, the NBL retrieves the appropriate interface to bind the flow to and issues a socket interface "bind" (909) before issuing the "connect" (911) commands to the network stack.

If, on the other hand, it is determined at step 901 that the call is for HTTP (or that it may be for HTTP, which will be checked again later in response to the write call), flow instead proceeds to step 903, in which the NBL creates an HTTP Flow Monitor object. This is the code that will parse the HTML that will be returned to the browser of the client (through the network stack and network binding layer) in this TCP/UDP session in response to the object messages that will follow. That HTTP Flow Monitor object will parse the code looking for tags, try to determine content type based on the tags, and add corresponding entries in the binding table. This results in deferring of the connect call, as shown at 905.

Figure 10:
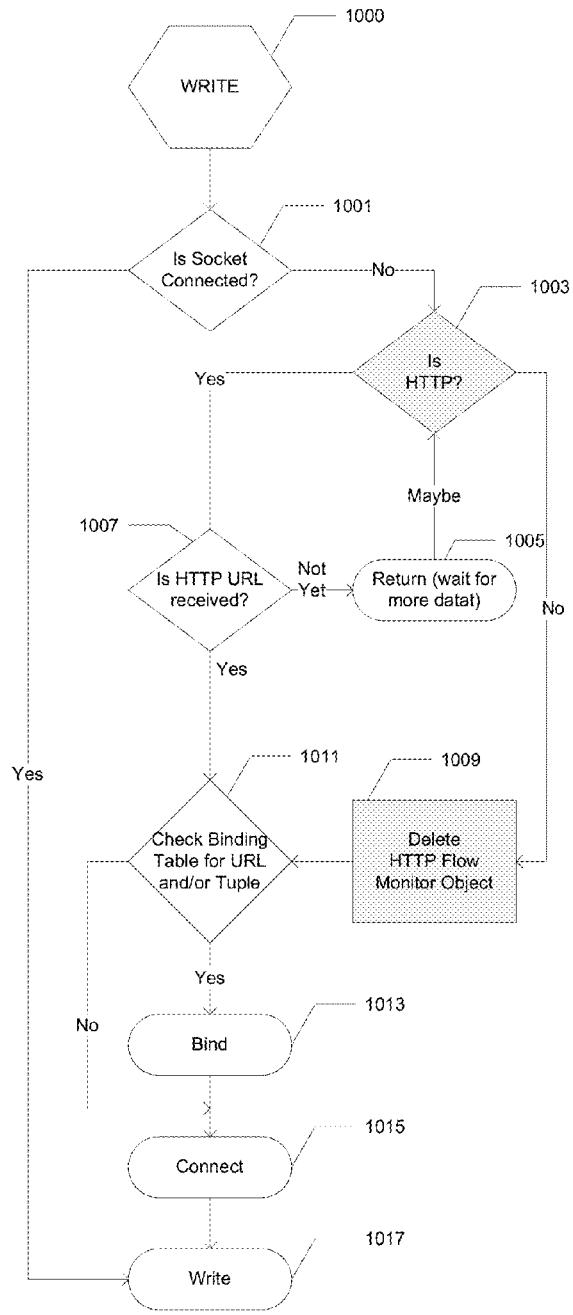
FIG. 10 is a flow diagram showing operation in accordance with the first exemplary embodiment of the NBL when the application layer issues a write command in association with an HTTP session.

Referring now to FIG. 10, it shows NBL operation in response to a write command received from the browser such as write commands 811 and 833 in FIG. 8. Particularly, upon receiving a write command 1000, the NBL first determines if the connect has been deferred for this flow (1001). If not deferred, i.e. a socket connection has already been established, the flow is not subject to the procedures described hereinabove, and the write call is simply forwarded to the network stack (1017).

However, if the connect has been deferred, flow instead proceeds to step 1003, in which it is determined if the flow is an HTTP flow. If so, flow proceeds to step 1007, in which it is determined if an HTTP URL has been received. It should be noted that, since HTTP is a stream-based protocol, and the full message may be sent in multiple writes, a complete HTTP URL might not be received immediately. This is reflected in the flowchart by including step 1005, which represents the potential need to wait for further data when the HTTP URL is not completely received. Payload within the "write" call is added to the data buffer until a full HTTP payload is accumulated. When it is determined in step 1007 that a complete HTTP URL has been received, flow proceeds to step 1011, in which the NBL checks the binding table to see if it has a matching HTTP URL and/or tuple. Returning to step 1003, if it is determined that the flow is not HTTP, then flow instead proceeds to step 1009 in which the HTTP flow Monitor object that was created in step 903 of the process of FIG. 9 is deleted. From there, flow proceeds to step 1011, where the binding table is checked for the URL and/or a matching tuple.

If a match is found in the binding table, then the process proceeds to step 1013, in which the flow is bound to the interface specified for that tuple or URL in the binding table before the "connect" command is issued (1017). If, on the other hand, no matching entry is found in the binding table, the binding step 1013 is skipped, and a connection is made at step 1015 using default parameters. In either event, the NBL will then forward the write command received from the browser at step 1002 the network stack (1017).

Referring now to FIG. 11, it shows the operation of the NBL in response to receipt of a read command 1100, such as read command 817 in FIG. 8. This process corresponds largely to item 821 in FIG. 8. Particularly, upon receiving incoming data from the Network Stack, the NBL reads the data (1101). It checks the incoming data to see if the flow is one of its monitored HTTP flows (1103). If not, the NBL simply passes the data along to the browser (1109). If, on the other hand, the flow is one of the monitored HTTP flows, processing instead proceeds to step 1105, in which the data is passed to the HTTP Flow Monitor object. In step 1107, the HTTP Flow Monitor object performs its function as described hereinabove, including (a) inspecting the HTTP response for HTML tags, (b) determining if the content type of any of those tags can be determined, and, (c) if so, adding suitable interface binding entries to the binding table. The process then ends at step 1109.

When a process ends, all URL entries generated by tag monitoring should be removed from the Binding Table. FIG. 12 is a flow chart illustrating the NBL process performed when an HTTP flow is closed. This process has not been previously represented in any of the figures. When an HTTP flow is closed (1200), the NBL first determines if it was monitoring that flow (1201). If so, it deletes the HTTP Flow Monitor object (1203) and closes the connection (1205). If, on the other hand, it is determined in step 1201 that the NBL was not monitoring the flow, flow instead proceeds directly to step 1205, in which the connection is closed.

Table 1 below illustrates an exemplary data structure for the binding table entries. As shown and described above, each table entry comprises the flow identifier, be it a 3-tuple, 5-tuple, or URL. In the DNS based embodiment of FIGS. 13-15 described below, it could be a hostname too. The flow identifier is paired with a network interface type. Optionally, a Process ID may be included, which is a flag that is set if the entry should be deleted from the table when the corresponding process is ended. Alternately, the process may omit this item and be preprogrammed to delete all entries when their corresponding processes are ended. As another option, alternately or additionally, a CreatedOn item may be included in entries for purposes of deleting table entries automatically after a predetermined amount of time. For dynamic entries in the table, one or both of the Process ID and CreatedOn fields should be used in order to remove stale entries and keep the size of the table manageable over time.

TABLE 1

| Name | Type | Description |
| --- | --- | --- |
| flowIdentifier | Flow Identifier | Tuple or URL |
| Network Interface | String | Network interface to bind to (ex: wlan0) |
| Process ID | Integer | Set if entry should be removed when process ends (URL from tag monitoring for example) |
| CreatedOn | Date | Date for removing entries based on age. |

Typically, for client sockets, binding is conducted automatically by the network stack if the application does not do it. However, if a socket is bound by an application, it cannot be re-bound later. To handle this case, the Network Binding Layer could also intercept the bind function and defer its action in the same way that the connect is deferred.

Asynchronous sockets may require that other OS functions be intercepted to provide the proper behavior while the connect and write calls are deferred. For example, a select call may be used to wait until a socket is connected, or for all data to be written.

The process described above essentially involves choosing the interface on which the socket will be initially created. Accordingly, it would appear that this technique would not work for persistent HTTP connections, in which multiple GETs can occur in one connection. However, such persistent HTTP connections typically are used to load multiple instances of similar content on the same page, such as multiple pictures embedded in a page. Moreover, large content, such as a large video file, typically is loaded using separate sessions. Therefore, even for persistent connections, the process should nevertheless be effective for enforcing network policies.

Figures 13, 14, 15:
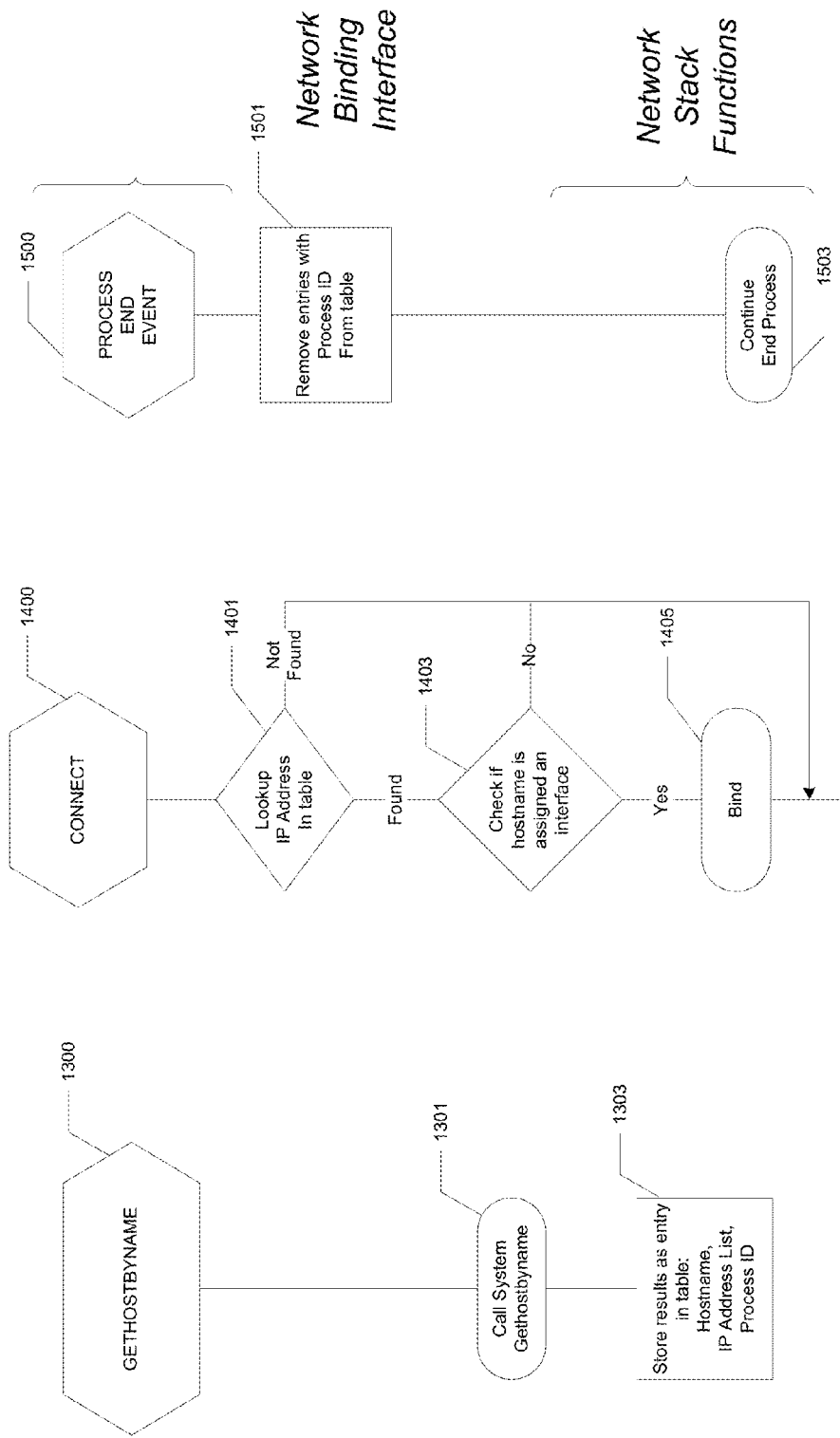
FIG. 13 is a flow diagram showing operation in accordance with a second exemplary embodiment of the NBL when an application commences an HTTP session.
FIG. 14 is a flow diagram showing operation in accordance with the second embodiment of the NBL when the application layer issues a connect command in association with an HTTP session.
FIG. 15 is a flow diagram showing operation in accordance with the second exemplary embodiment of the NBL upon closure of an HTTP session.

FIGS. 13-15 are flowcharts illustrating operation in accordance with an alternative embodiment. However, it should be noted that this operation also can be incorporated with the other processes and used as a supplement to the operations discussed and illustrated hereinabove. More particularly, FIGS. 13-15 illustrate an alternate way of binding data flows (e.g., TCP flows) to a given interface type (Wi-fi, cellular) based on hostname. For instance, if the appropriate interface type cannot be determined using one of the previously described processes, then these processes can be used as a backup to select an interface type. Then, only if these processes also fail to determine an appropriate interface type, will the default interface type be selected. Alternatively, this process can be used entirely independently.

The apparatus for performing the processes disclosed in FIGS. 13-15 is largely unchanged from that shown and described in connection with FIG. 7. In essence, NBL 705 still would be interposed between the network stack 707 and the socket API 703, but would simply perform these alternate or additional functions.

This process involves a binding table containing interface-binding entries that associate domain names, IP addresses, and/or URLs with interface types. It also relies on DNS (Domain Name Server) exchanges to associate flows with domain names. Particularly, the NBL may monitor each session flow passing through it for a domain name, IP address, and/or URL that matches any interface-binding entry in the binding table and, if it finds a match, bind that session flow to interface type identified in the matching entry.

In one embodiment, the interface-binding entries in the binding table are preprogrammed or predetermined. Some of the table entries may be based on definitions from the ANDSF entity and/or may be selected independently of ANDSF. In any event, for instance, it may be determined that any flows from www.YouTube.com™ will be routed through a Wi-fi socket interface (on the assumption that it is most likely a video flow, for instance). The table will thus store one or more numerical IP addresses that correspond to the YouTube.com domain name paired with a network interface type to bind to (or, alternately, a content type, such as video, which maps directly to a network interface type).

Turning now to FIG. 13, upon receiving a gethostbyname (or similar DNS resolving function) from the browser or other application (step 1300), the NBL calls a process herein termed System Gethostbyname (step 1301). This process transmits a query to a DNS exchange to determine the IP address or addresses corresponding to the hostname in the connect command. At 1303, the NBL stores the hostname, corresponding IP address list and the process ID in a table, herein termed the hostnameToIPAddress table. This table will be used to look up hostname by IP Address and Process ID when a TCP socket calls Connect (FIG. 14, discussed below).

Referring to FIG. 14, when the NBL receives a connect command (1400) from the browser, it checks the hostname to IP address table to determine if the connect command contains an IP address that matches one of the IP addresses of an entry in the table (step 1401). If not, process flows to step 1407 and a connection is made using a default interface. If, however, a match is found in the hostname to IP address table, process instead flows to step 1403, in which the NBL checks if the hostname is assigned an interface in the binding table, i.e., if there is an interface-binding entry having that hostname in the binding table. If not, processing proceeds directly to step 1407, in which a default connection is established. If, on the other hand, the hostname is assigned an interface in the table, processing instead first proceeds to step 1405, in which the flow is bound to the interface specified for that hostname in the binding table before the "connect" command is issued (step 1407).

Finally, referring to FIG. 15, when a process end event occurs, e.g., the browser is closed (1500), the NBL removes the entries from the hostname to IP address table for that process (step 1501) and the process is terminated (step 1503). If receiving the process end event is difficult, entries could alternately or additionally be removed after reaching a certain age. However, such a process would likely be slightly less accurate in that the process could be terminated prematurely. A similar process can be used for UDP via the sendTo/sendmsg socket API calls.

Since resolving host names and using the resulting IP address are independent functions, there exists a small potential for inaccuracies. For instance, it is possible that one IP address will map to multiple hostnames. On the other hand, this is unlikely to happen within the same process. Also, hardcoded IP addresses would not be detected.

The concepts, methods, apparatus, and systems discussed herein also may be applied for use in firewalls to block content flows (rather than to select the interface types for content flows). That is, a firewall, such as in a UAM captive portal, may wish to allow content from certain locations (e.g., websites) to pass through while blocking all other traffic. This process is sometimes called whitelisting. Whitelisting typically is achieved by specifying the desired host names, such as 'www.acme.com'. However, websites often reference content from many other sources, such as Content Data Networks (CDNs) and web services (Google Maps™ for instance). Such references represent links that are embedded—i.e. loaded automatically. In order to assure the web site functions as intended at the client machine, all of these other sources must be whitelisted as well. Moreover, such automatically loaded dynamic links must be differentiated from other links that the user would "click" on to load new content—and for which the decisions may be made based on host-name-based policies or embedded link policies. The sources of embedded links may vary over time, by location, or by user. Moreover, some hosts may need to be treated differently when linked via embedded links versus when accessed via explicit clicking Additionally, the link type (e.g. video/audio/image/script) may determine whether it should be allowed.

The invention could be applied in a firewall in connection with any application layer protocol with forward linked content. Once again, using HTTP with HTML as an example, the firewall process would inspect the HTTP response for links, and then these links would be dynamically added to the firewall The following is an example use case:
1. A client connected to the network loads 'www.acme.com' in a browser;
2. The network port firewall passes the HTTP request to the base URL;
3. The web server on the internet returns a response page with image and video links to a CDN (mycdn.com) ;
4. Similarly to that described hereinabove in connection with FIGS. 8 and 10, for example, the dynamic whitelist process examines the response and adds to a Whitelist table entries for the URLs for the images, video, and/or other links in the response HTML page that point to other hosts, e.g., mycdn.com/image_123 and 'mycdn.com/video_10';
5. The client browser receives the response and searches the table for an entry having a URL that matches the URL from which the response originated. The download is permissible because the URL mycdn.com/image_123 is in the Whitelist table and so the browser starts loading images from 'mycdn.com/image_123'.;
6. The client browser starts loading the embedded video. The download is allowed by the firewall because the URL mycdn.com/video_10' is in the Whitelist table;
7. The client session is complete;
8. When the session completes (or some predetermined time period thereafter), the temporary URLs are removed from the firewall's Whitelist table.

The dynamic whitelisting could be done on a per-client basis or for all clients in a network. The choice would depend on how much the content varies per client and if there is any risk exposing whitelisting URLs for clients not served that information.

The solution would involve parsing the HTML in the HTTP responses in much the same way as described hereinabove in connection with FIGS. 8-12, but whitelisting instead of classifying the referenced URLs by interface type.

While the embodiments described herein have been described in connection with HTTP and HTML, this is merely exemplary. The concepts described herein may be used in connection with any communication protocol and content format combination that comprises communication data that contains links to other data that must or may be transmitted, e.g., protocols that include forward links. Many additional content formats and protocols satisfy these requirements. Among such content formats are XML and Javascript. Among the communication protocols that meet these requirements are RTSP, FTP, CoAP, SOAP, OMA, DM, and SIP.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the methods, apparatus, and systems described above are possible without departing from the scope of the invention. In view of the wide variety of embodiments that can be applied, it should be understood that the illustrated embodiments are exemplary only, and should not be taken as limiting the scope of the following claims.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the described methods.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. §112, ¶6, and any claim without the word "means" is not so intended.

The invention claimed is:

1. A method, comprising:
creating, by a wireless transmit/receive unit (WTRU), a first communication session having links;
receiving incoming data in the first communication session, the incoming data containing a link;
identifying a traffic content type associated with the link;
creating an entry in a data structure associating the link with an interface type as a function of the traffic content type;
subsequent to creating the entry in the data structure, receiving a request to create a second communication session;
prior to creating the second communication session, determining if the request to create the second communication session matches the link of the entry in the data structure; and
when the request to create the second communication session matches the link of the entry in the data structure, selecting an interface for the second communication session of the interface type in the entry.

2. The method of claim 1, wherein the communication sessions are HTTP sessions.

3. The method of claim 2, wherein the data structure is configured to store a plurality of said entries in said data structure.

4. The method of claim 2 wherein the identifying the traffic content type associated with the link comprises searching HTML content associated with the first HTTP session for a tag.

5. The method of claim 4 wherein the identifying the traffic content type associated with the link further comprises parsing the URL of the tag.

6. The method of claim 1 wherein the selecting comprises choosing a radio access technology (RAT).

7. The method of claim 6, wherein the (RAT) is chosen based on a data mobility policy.

8. The method of claim 7, wherein the data mobility policy is an Access Network Discovery Selection Function (ANDSF) Management Object (MO).

9. The method of claim 1 comprising:
  monitoring for communication sessions using any one of a source port, an application name, an application type, packet inspection, and inspection of a domain name system (DNS) request.

10. A method of controlling content flow into an application comprising:
  creating, by a wireless transmit/receive unit (WTRU), a first communication session having links;
  receiving incoming data in the first communication session, the incoming data containing a link identifying a location of other data;
  creating an entry in a data structure identifying the location of the other data;
  receiving a request to create a second communication session, the request including a location of data to be downloaded in the second communication session;
  prior to creating the second communication session, determining if the location in the request matches a location of an entry in the data structure; and
  when the location in the request matches a location of an entry in the data structure, permitting establishment of the second communication session.

11. The method of claim 10 wherein the location in the entry in the data structure is a URL identified in the link.

* * * * *